US010343377B2

(12) United States Patent
Levasseur et al.

(10) Patent No.: US 10,343,377 B2
(45) Date of Patent: Jul. 9, 2019

(54) COLD-BENT INSULATING GLAZING

(71) Applicant: SAINT-GOBAIN GLASS FRANCE, Courbevoie (FR)

(72) Inventors: Fabien Levasseur, Tourcoing (FR); Romain Decourcelle, Compiegne (FR); Christophe Swiderski, Amigny-Rouy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 181 days.

(21) Appl. No.: 15/465,640

(22) Filed: Mar. 22, 2017

(65) Prior Publication Data

US 2017/0217131 A1 Aug. 3, 2017

Related U.S. Application Data

(62) Division of application No. 14/358,929, filed as application No. PCT/FR2012/052608 on Nov. 13, 2012, now Pat. No. 9,694,570.

(30) Foreign Application Priority Data

Nov. 17, 2011 (FR) ...................................... 11 60473

(51) Int. Cl.
*E06B 3/677* (2006.01)
*E06B 3/663* (2006.01)
(Continued)

(52) U.S. Cl.
CPC ...... *B32B 17/10055* (2013.01); *B23P 11/025* (2013.01); *B29C 53/04* (2013.01);
(Continued)

(58) Field of Classification Search
CPC .. E06B 3/66314; E06B 3/37326; E06B 3/677; E06B 3/6736; E06B 3/67386;
(Continued)

(56) References Cited

U.S. PATENT DOCUMENTS 4,095,968 A 6/1978 Bristow
4,614,676 A * 9/1986 Rehfeld ............ B32B 17/10036
428/34

(Continued)

FOREIGN PATENT DOCUMENTS

DE 195 19 504 A1 11/1996
DE 100 24 525 A1 11/2001
(Continued)

OTHER PUBLICATIONS

Graham Dodd, "Comparative Analysis of Bent Glass and Cold-Bent Glass Panels", Arup Materials Consulting, Sep. 2-5, 2009, 19 pages (with English Translation).

(Continued)

*Primary Examiner* — Donald J Loney
(74) *Attorney, Agent, or Firm* — Oblon, McClelland, Maier & Neustadt, L.L.P.

(57) ABSTRACT

The invention relates to a glazed module comprising a metal framework and an insulating glazing comprising a water-tight barrier, said insulating glazing being cold-bent, the metal framework and the insulating glazing being rendered integral by a holding means which forces the insulating glazing to retain the bent shape conferred on it by the framework. The invention also relates to a process for the preparation of the glazed module comprising a metal framework and an insulating glazing, the insulating glazing being cold-bent, after it has been assembled with a water-tight barrier, by a force which causes it to take the shape of the metal framework and then held in this bent shape by a holding means.

16 Claims, 3 Drawing Sheets

(51) Int. Cl.

| | | |
|---|---|---|
| *B32B 17/10* | (2006.01) | |
| *E06B 3/673* | (2006.01) | |
| *B23P 11/02* | (2006.01) | |
| *E06B 3/66* | (2006.01) | |
| *B29C 53/04* | (2006.01) | |
| *B32B 38/00* | (2006.01) | |
| *B32B 7/12* | (2006.01) | |

(52) U.S. Cl.
CPC .......... *B32B 7/12* (2013.01); *B32B 17/10036* (2013.01); *B32B 17/10091* (2013.01); *B32B 17/1099* (2013.01); *B32B 17/10137* (2013.01); *B32B 17/10293* (2013.01); *B32B 17/10761* (2013.01); *B32B 17/10889* (2013.01); *B32B 38/0012* (2013.01); *E06B 3/66* (2013.01); *E06B 3/66314* (2013.01); *E06B 3/677* (2013.01); *E06B 3/6736* (2013.01); *E06B 3/67326* (2013.01); *B32B 2038/006* (2013.01); *B32B 2307/7265* (2013.01); *E06B 3/673* (2013.01); *E06B 3/67386* (2013.01); *E06B 2003/67395* (2013.01); *Y10T 29/49865* (2015.01)

(58) Field of Classification Search
CPC ................ B32B 17/10055; B32B 7/12; B32B 17/10036; B32B 17/10091
See application file for complete search history.

(56) References Cited

U.S. PATENT DOCUMENTS

| 4,723,386 A | 2/1988 | Sandow |
| 4,899,507 A | 2/1990 | Mairlot |
| 5,115,612 A * | 5/1992 | Newton .................... E06B 3/66 |
| | | 52/208 |
| 2010/0031590 A1 | 2/2010 | Buchwald et al. |
| 2010/0101161 A1* | 4/2010 | Dudash .................... E06B 1/62 |
| | | 52/202 |

FOREIGN PATENT DOCUMENTS

| DE | 10 2008 031770 A1 | 1/2010 |
| EA | 201000768 A1 | 4/2011 |
| EP | 0 282 468 A | 9/1988 |
| FR | 2 676 049 A | 11/1992 |
| FR | 2 676 049 A1 | 11/1992 |
| NL | 1 029 935 C | 3/2007 |
| WO | 98/01649 | 1/1998 |
| WO | 2008/107612 A2 | 9/2008 |
| WO | WO 2011/029852 | 3/2011 |

OTHER PUBLICATIONS

International Search Report dated Jan. 28, 2013 in PCT/FR2012/052608 filed Nov. 13, 21012.

Ying-Chun Ou, "Effects of surface properties of glass and film, and the interface properties on the adhesion of laminated glass" Chinese Doctoral Dissertations & Master's Theses Full-text Database (Master), Mar. 15, 2004, 5 Pages, with English language translation.

* cited by examiner

COLD-BENT INSULATING GLAZING

CROSS REFERENCE TO RELATED APPLICATIONS

The present application is a Division of U.S. application Ser. No. 14/358,929, filed May 16, 2014, now allowed; which is a 35 U.S.C. § 371 national stage patent application of International patent application PCT/FR2012/052608, filed on Nov. 13, 2012, published as WO 2013/072612 on May 23, 2013, the text of which is incorporated by reference, and claims the benefit of the filing date of French application no. 1160473, filed on Nov. 17, 2011, the text of which is also incorporated by reference.

The invention relates to a glazed module comprising a panel of the cold-bent insulating glazing type and to a process for the cold bending of a panel of the insulating glazing type, which can in particular comprise a laminated glazing.

BACKGROUND

An insulating glazing, also known as multiple glazing, comprises several glazings separated by a cavity filled with gas (argon, krypton, air, and the like), optionally under reduced pressure. It can be a double glazing if it comprises only a single gas-filled cavity separating two glazings. It can be a triple glazing if it comprises two gas-filled cavities and three glazings, each gas-filled cavity separating two of the glazings.

A glass substrate comprises a single sheet of mineral glass, if appropriate covered with one or more thin layers of the following types, antireflection, solar-protection, abrasion-resistant, and the like. A glass substrate of an insulating glazing can form part of a laminated glazing. An insulating glazing can be composed exclusively of laminated glazings separated by a gas-filled cavity. In all cases, an insulating glazing comprises at least one gas-filled cavity separating two glass substrates, it being possible for each of these glass substrates, if appropriate, to form part of a laminated glazing.

A laminated glazing comprises several glass substrates separated by an interlayer made of polymer material. The preparation of flat insulating or laminated glazings is well mastered. The preparation of bent laminated glazings is much more problematic and increasingly problematic as the curvatures to be conferred increase. If the curvatures are high, the hot bending beforehand of the glass sheets while the glass is soft (generally at greater than 500° C.) may be necessary. If the curvatures of a glazing are not very great, it is possible to envisage cold bending it after the end of the manufacture thereof. The expression "cold bending" generally means at less than 200° C., at which temperature the glass is not soft. In the context of the present patent application, "cold bending" means "at less than 200° C.".

WO98/01649 teaches the cold bending of a laminated glazing.

EP 282 468 teaches the bending between 80 and 140° C. of a laminated glazing comprising a dip-coated glass substrate. Heating between 80 and 140° C. serves to soften the interlayer PVB of the laminated glazing. However, the bending of a laminated glazing above 80° C. results in an unacceptable aging of the interlayer made of polymer material, which is reflected by the formation of fine bubbles but ones visible to the naked eye, and furthermore that it is advantageously possible to carry out the cold bending between 30 and 80° C., to reduce the loads necessary for the bending and also the shear stresses between the interlayer made of polymer material and the glass substrates and thus reduce the risks of delamination.

FR 2 676 049 and DE102008031770 teach the assembling of a glazing laminated by a PVB, the glass sheets being curved during the assembling operation. It is thus the PVB which maintains the curving of the laminated glazing.

DE19519504 teaches the bending of a laminated glazing at 130° C.

WO2008107612 teaches an insulating glazing incorporating a pane bent before assembling the insulating glazing.

SUMMARY

It has now been discovered that the cold bending of an insulating glazing is possible, despite the fact that it is already assembled. This bending is in particular possible at less than 30° C., for example between 0 and 30° C., in particular between 5 and 28° C. Such a bending can also be carried out between 30 and 80° C., in particular between 30 and 50° C. This means that it is possible to carry out the bending of an insulating glazing at ambient temperature in virtually any country. It is thus possible to generally carry out the bending according to the invention without contributing heat to the glazing and without causing its temperature to rise with respect to that of the ambient air.

DETAILED DESCRIPTION

Surprisingly, the deformation by bending according to the invention of an insulating glazing (generally flat before being bent) is possible without this producing a deterioration in the water-tight barrier of the glazing. This water-tight barrier comprises the components which frame the glazing and which separate different glass substrates of the insulating glazing in order to bring about the space necessary for the gas-filled cavity. In a way known to a person skilled in the art, these components comprise a hollow interlayer (also known as spacer), a profiled element which can be made of aluminum or of steel or of polymer (in particular of "Luran") and which comprises a water absorber, and an external seal made of polymer (silicone, PU, polysulfide), these two components being placed in the thickness of the gas-filled cavity. The hollow interlayer is adhesively bonded by a "butyl" adhesive to the glass substrates separated by it.

The radii of curvature conferred on the insulating glazing by the process according to the invention can reach 5 meters. Thus, the insulating glazing can be bent in order for its surface to exhibit, at at least one point, a radius of curvature in at least one direction of between 5 and 20 m. If appropriate, in the case of a bending of the cylindrical type, the surface can have, at such a point, such a radius of curvature in one direction and no curvature (infinite radius of curvature) orthogonal to said direction. If the insulating glazing comprises a laminated glazing, then, preferably, the glazing is bent so that its surface does not exhibit, at any point, a radius of curvature of less than 6 m. This is because such a radius of curvature represents a limit in terms of durability for a laminated glazing.

According to the invention, the insulating glazing can comprise a laminated glazing, indeed even several laminated glazings. In particular, the insulating glazing can comprise only laminated glazings. In particular, the insulating glazing can be composed of two laminated glazings separated by a gas-filled cavity, each laminated glazing comprising two glass sheets separated by an interlayer made of polymer material. In this insulating glazing, each laminated glazing is generally of the following type: dip-coated glass/PVB/dip-coated glass 6/4/6 mm, the two laminated glazings being separated by a gas-filled cavity with a thickness of 16 mm.

For the case where the insulating glazing comprises a laminated glazing, the bending can be carried out under 30° C., in particular between 0 and 30° C., or above 30° C. In particular, the insulating glazing comprising a laminated glazing can be prepared at ambient temperature, without it being necessary to heat it. However, an insulating glazing according to the invention comprising a laminated glazing is preferably bent between 30 and 80° C., a temperature above 40° C. being particularly satisfactory. A temperature below 75° C. is generally suitable. The temperature range between 40 and 75° C. is particularly suitable when the insulating glazing comprises a laminated glazing. In order to carry out this process, in practice, first a flat insulating glazing is heated until the interlayer of the laminated glazing reaches the recommended temperature range (bending temperature) and then the insulating glazing is bent. Preferably, the insulating glazing is heated above the glass transition temperature of the interlayer made of polymer material. The glass transition temperature is determined by viscoanalysis with kinetic measurements. The fact of heating above the glass transition is favorable to the creep of the polymer material during the bending, which has the consequence that the permanent shear stresses at the interfaces between said material and the glass substrates are reduced. The interlayer made of polymer material can in particular be a polyvinyl butyral (referred to as "PVB"), an ethylene/vinyl acetate or a film of ionomer resin, in particular SentryGlas sold by DuPont. For the case of an ionomer resin, it is preferable to heat the insulating glazing to more than 45° C.

Thus, the invention relates in particular to a process for the preparation of a bent glazed module comprising a metal framework and a panel of the insulating glazing type comprising a laminated glazing, said laminated glazing comprising glass substrates separated by an interlayer made of polymer material, the panel being bent, after the laminated glazing has been assembled, by a force which causes it to take the shape of the metal framework and then held in this shape by a holding means, the bending being carried out while the interlayer is at a temperature of between 30 and 80° C., in particular while the interlayer is at a temperature of greater than 40° C., in particular while the interlayer is at a temperature of less than 75° C. Preferably, the bending is carried out while the interlayer (in particular made of PVB) is at a temperature greater than its glass transition temperature during the bending.

In order to heat the insulating glazing, in particular between 30 and 80° C., it is possible to very easily operate by juxtaposing a heating element, such as, for example, a heating blanket, with the insulating glazing. Use may in particular be made, as heating blanket, of those sold by Vulcanic. It is possible simply to cover the insulating glazing with the heating element, until the desired temperature is obtained, and to carry out the bending. It is possible to leave the heating element juxtaposed with the insulating glazing during the bending. It is possible to start heating up an insulating glazing by the heating element while carrying out the bending of another insulating glazing which has just been heated. Of course, a person skilled in the art knows, as a function of the nature of the insulating glazing and of its dimensions (main faces and thickness), how to find the heating, duration and rate conditions regarding each operation in order to optimize the process.

The process according to the invention is suitable for the cold bending of insulating glazings not comprising any laminated glazing or comprising one, indeed even two, laminated glazings, indeed even more. If the insulating glazing does not comprise a laminated glazing, then it is generally composed of glass substrates each comprising a single glass sheet which are separated by a gas-filled cavity. It can in particular be the very conventional insulating glazing with which apartment buildings are fitted, of the 4×16×4 mm type (two glass substrates with a thickness of 4 mm separated by a gas-filled cavity with a thickness of 16 mm). Such a glazing can be bent at ambient temperature.

All the glass sheets present in the insulating glazing can be dip-coated. The invention is particularly suitable for the cold bending of an insulating glazing comprising two laminated glazings separated by a gas-filled cavity, each laminated glazing comprising two dip-coated glass sheets separated by an interlayer made of polymer material. In this insulating glazing, each laminated glazing is generally of the following type: dip-coated glass/PVB/dip-coated glass 6/4/6 mm, the two laminated glazings being separated by a gas-filled cavity with a thickness of 16 mm.

In particular, the invention is of particular use in the preparation of insulating glazings which have to be fitted to buildings, the glazings of which have to appear curved. These buildings, in particular of the type consisting of high-rise buildings of business districts, can have particularly bold shapes and may require the preparation of curved insulating glazings having shapes which can vary for one and the same building.

Thus, the invention also relates to a process for the preparation of a bent glazed module comprising a metal framework and an insulating glazing comprising glass substrates separated by a gas-filled cavity, the insulating glazing being cold-bent (that is to say, bent at less than 200° C.), after it has been assembled with a water-tight barrier, by a force which causes it to take the shape of the metal framework and then held in this bent shape by a holding means. Thus, the insulating glazing is bent after the assembling thereof has been fully completed. In particular, if a resinous constituent used for the water-tight barrier takes several days to be satisfactorily polymerized and the cold bending takes place after this period of time.

Modules are produced which comprise the insulating glazing and a metal framework capable of holding in shape the cold-bent insulating glazing and thus acting as mold. This metal framework is generally made of extruded aluminum or steel. To do this, the insulating glazing is brought into contact with the metal framework and a force is applied to the insulating glazing at one or more points in order to cause it to take the shape of the framework. The forces applied can range, for example, up to 200 kg per point of contact. Use may be made, in order to carry out this deformation of the insulating glazing, of tie rods, hydraulic jacks, weights or robots. The insulating glazing is held in shape on the framework by a holding means, such as clamps, or by an adhesive, according to the radius of curvature to be maintained. Of course, if adhesive bonding is concerned, a waiting period is required for the adhesive to set well (by polymerization, crosslinking, and the like) before removing the force by which the insulating glazing is applied to the framework. A suitable structural adhesive is, for example, that of the silicone type sold by Dow Corning under the reference DC 3362. If the curvature to be maintained is high (low radius of curvature), the use of clamps may be essential. It is also possible to deform the insulating glazing on the framework by applying, to the glazing, a profiled element framing it and by screwing down the screws, narrowing the distance between the profiled element and the framework.

By gradually screwing down, the insulating glazing takes the shape of the framework. After screwing down has been completed, the insulating glazing has taken the shape of the framework and is held in shape by virtue of the profiled element screwed to the framework. The holding means in this instance comprises the profiled element and its screws. By virtue of the invention, the bending operation itself (between the start of the deformation and the end of the deformation of the insulating glazing) can be fast, in particular between 10 and 120 seconds. If appropriate, the insulating glazing can be preheated, in particular between 30 and 80° C., in particular by placing it on a heating blanket, before bending it as has just been described.

The "cold" deformation of the insulating glazing must not be carried out while generating unacceptable stresses in the glass sheets of which it is composed. Thus, the maximum permanent stress allowed in the construction industry for a glass which has not been dip-coated is 10 MPa. The maximum permanent stress allowed in the construction industry for a dip-coated glass is 40 MPa. According to the curvatures to be conferred on the insulating glazing, it may thus be advantageous to use glass sheets which are at least hardened, indeed even dip-coated.

In particular, the insulating glazing may be bent simultaneously along two different directions (twisted glass).

The insulating glazings to which the invention relates can be large, since they can have a main face with an area of greater than 3 m$^2$ and even of greater than 4 m$^2$ and even of greater than 5 m$^2$. It should be noted that an insulating glazing (and also a sheet or a glazing) comprises two main faces and an edge.

It is advisable during the bending not to exceed the maximum acceptable stresses of the glazing in use. For the case where the insulating glazing comprises a laminated glazing, a critical factor limiting the amplitude of the bending is the shear stress at the interfaces between the interlayer made of polymer material and the glass substrates which are juxtaposed with it. Preferably, this stress at 20° C. remains less than 3 MPa and preferably less than 2 MPa and more preferably less than 1.5 MPa during the bending. If the interlayer made of polymer material is heated to more than 30° C., the shear stress at the interfaces experienced during the bending is much lower than that which may be experienced in use when the ambient temperatures fall. This is why, before carrying out the bending, it is advisable to determine, by routine tests, whether the anticipated bending does not exceed the shear stress at the interfaces between the interlayer made of polymer material and the glass substrates at 20° C. This expert appraisal can be carried out very simply by the method described below. According to this method, these shear stresses can be displayed by juxtaposing, with the laminated glazing, a polarizing film on one of its main faces. After having positioned this polarizing film on a sample of the laminated glazing, a tensile test is carried out by pulling, on one side, on one of the glass substrates and, on the other, on the other glass substrate. The appearance of the stresses is reflected by a coloration in transmission. The coloration changes with the intensity of the stresses. It is thus sufficient to pinpoint the color corresponding to the maximum stress allowed, as the case may be (3 or 2 or 1.5 or 1 MPa, or other). This calibrating can be carried out with just one polarizing film juxtaposed with a main face of the laminated glazing. In this case, the coloration should be observed with a viewing angle of approximately 45° (angle between the normal to the glazing and the direction of viewing). It is also possible to place a film on each of the main faces of the laminated glazing, in which case the stresses can be displayed with any angle of observation. After carrying out the calibration (for a given interlayer made of polymer material and a given thickness of said interlayer), it can easily be confirmed, in production of the glazings (even on insulating glazings), that the maximum shear stresses are not exceeded by affixing a polarizing film to a main face of the glazing or two polarizing films, one on each of the main faces of the glazing. Thus, after bending and returning the interlayer to the temperature of 20° C., the state of the shear stresses at the interfaces between the interlayer made of polymer material and the glass substrates located on either side of the polymer material on being juxtaposed with it can be evaluated by applying a polarizing film to a main face of the insulating glazing and then by displaying the color transmitted through the insulating glazing and the film. This color can subsequently be compared with the colors of the calibration carried out beforehand in order to evaluate the shear stresses at the interfaces between the interlayer made of polymer material and said glass substrates and, according to the result of this comparison, to decide on the conformity of the module with respect to the specifications, that is to say to validate or discard the module.

The invention also relates to the glazed module produced according to the process of the invention. This module comprises a metal framework and an insulating glazing, said insulating glazing having been cold bent. Like any insulating glazing, the insulating glazing according to the invention and cold-bent according to the invention always comprises (in all the embodiments) a water-tight barrier. Like any insulating glazing, the insulating glazing according to the invention and cold-bent according to the invention always comprises (in all the embodiments) a gas-filled cavity (that is to say, at least one gas-filled cavity) separating two glass substrates. The present patent application applies to the insulating glazings comprising a water-tight barrier and a gas-filled cavity, said insulating glazings being cold-bent according to the invention after they have been fitted with the water-tight barrier. In all cases, the cold bending according to the invention is thus also applied to the water-tight barrier. The metal framework and the insulating glazing are rendered integral by a holding means which forces the insulating glazing to retain its bent shape conferred on it by the framework. Thus, the module also comprises a means for holding the bent shape of the glazing. If the holding means is removed, then the insulating glazing reverts to its original shape before bending (generally a flat shape), provided that the cold bending has been carried out within the elastic deformation region of all the components of the insulating glazing (including the water-tight barrier), which is recommended.

EXAMPLES

Example 1

Figure 1:
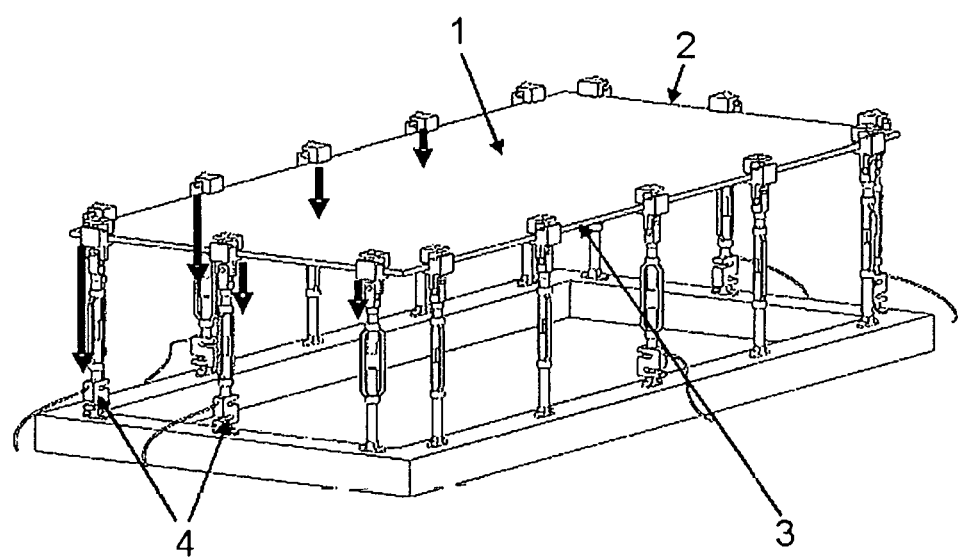
FIG. 1 represents a device which makes it possible to apply deformations to a glazing and to measure the stresses experienced.
Figure 2:
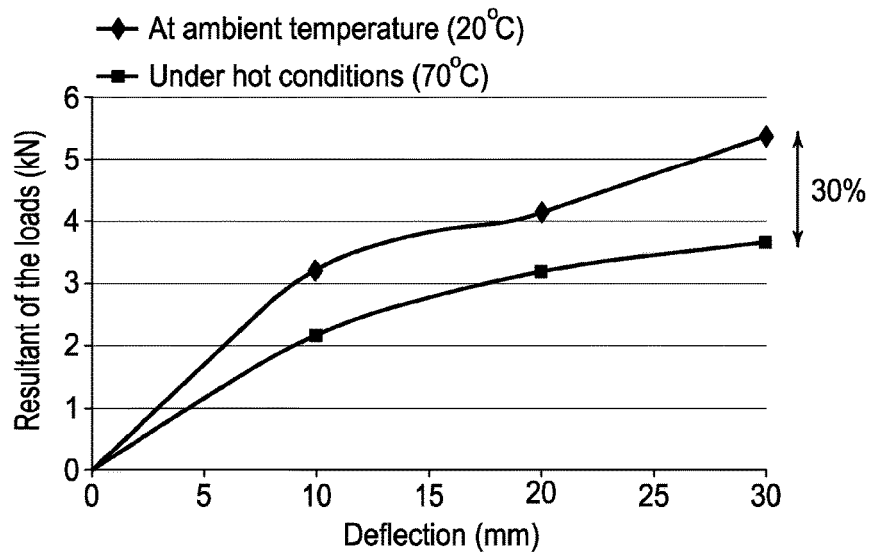
FIG. 2 represents the sum of the absolute values of the forces measured in two temperature cases (20 and 70° C.) and as a function of the deflection imposed on a laminated glazing by the device of FIG. 1.
Figure 3:
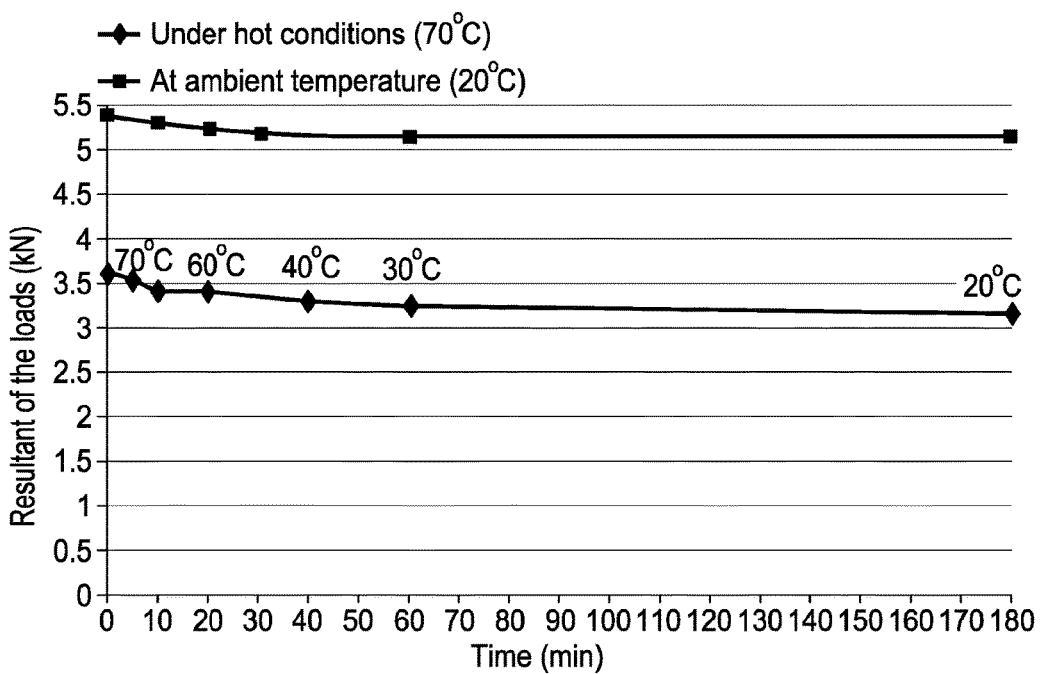
FIG. 3 shows the change over time in the sum of the absolute values of the forces in two temperature cases for application of deformations (20 and 70° C.).
Figure 4:
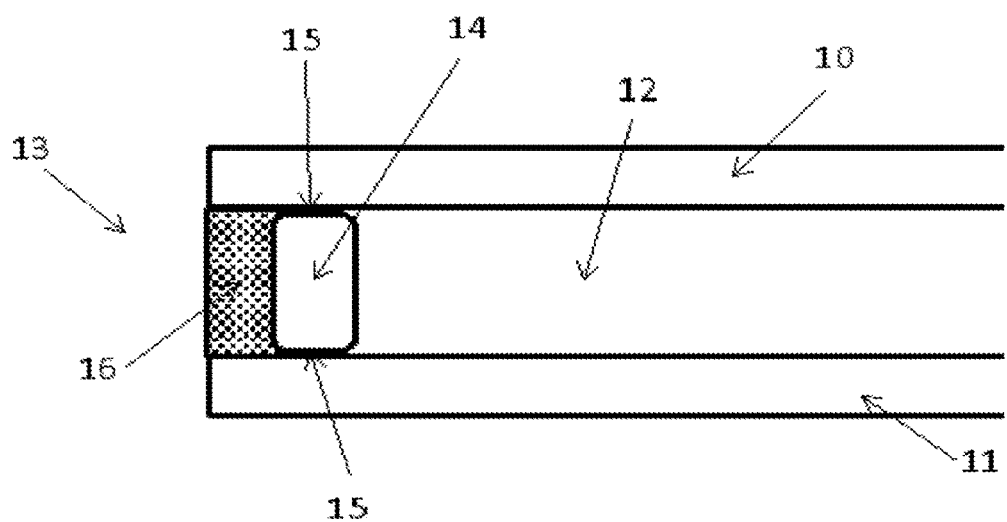
FIG. 4 illustrates the structure of the edge of an insulating glazing, well known to a person skilled in the art. The two glass substrates 10 and 11 are separated by a gas-filled cavity 12. The water-tight barrier 13 isolates the gas-filled cavity 12 from the outside world. The water-tight barrier comprises a hollow interlayer (or spacer) 14 adhesively bonded to the glass substrates 10 and 11 by a butyl adhesive 15 and an external seal 16 made of polymer goes all around the insulating glazing.

A dip-coated laminated glazing is manufactured by combining 2 dip-coated monolithic glazings, each at 120 MPa of compressing of the skins, each glazing having dimensions of 1938×876×8 mm, with 4 PVB interlayers (4 times 0.38 mm of PVB thickness). The glazing is subsequently subjected to a deformation as represented in FIG. 1. A fixed width 2 and a fixed length 3 of the glazing 1 are maintained and displacements are applied to the sides not kept fixed, as represented in FIG. 1, via vertical vectors directed downward. This was carried out after having brought the assembled glazing to the temperatures of 20° C. in one case and 70° C. in another case. Force sensors 4 placed under the tie rods exerting the displacements make it possible to measure the forces applied at different points on the periphery of the glazing. At some points, the forces are in tension and at other points the forces are in compression, so that the resultant is zero. The loads endured by the glazing are thus assessed by adding the absolute values of the forces. FIG. 2 represents the sum of the absolute values of the forces measured in the two temperature cases and as a function of the deflection. It is seen that the heating at 70° C. makes possible a reduction in the loads of the order of 30%. FIG. 3 shows the change in the sum of the absolute values of the forces as a function of the time, it being known that, for the test with preheating to 70° C., the glazing is immediately placed back in ambient air at 20° C. The fall in temperature of the glazing between 70 and 20° C. has been shown as a function of the time. It is seen that the resultant of the forces remains much lower in the case of preheating to 70° C., the saving of 30% being retained and even improved if the glazing deformed at 20° C. and that deformed at 70° C. and returned to 20° C. are compared. The interlayer in the case of the preheating to 70° C. will consequently age better, have less tendency to delaminate and have less tendency to turn white. This laminated glazing can be incorporated in an insulating glazing, it being possible for the latter to be cold-bent.

Example 2

A description is given, in this example, of the preparation of an insulating glazing combining a laminated glazing and a dip-coated glazing. The laminated glazing combined two 1.4 m×0.7 m glass sheets each with a thickness of 6 mm, assembled with 4 thicknesses of 0.38 mm of PVB. The dip-coated glass had dimensions of 1.4 m×0.7 m with a thickness of 8 mm. This laminated glazing and this dip-coated glazing were assembled in an insulating glazing comprising an argon-filled cavity having a thickness of 16 mm with a water-tight barrier comprising a spacer adhesively bonded to the glass with a butyl resin, a silicone strip going all around the insulating glazing between the spacer and the outside of the glazing. The assembly is left to polymerize in the open air for 15 days. The glazing is subsequently placed on a metal framework of cylindrical shape (curved in one direction but not perpendicularly to this direction), the radius of curvature of which was 15 m. The glazing is caused to take the shape of the framework and this shape is maintained by virtue of a metal profiled element which is screwed onto the framework. This bending was carried out at 20° C. The insulating glazing withstands the bending well owing to the fact that it is exerted in the elastic region of all its components.

The invention claimed is:

1. A glazed module, comprising:
   a metal framework;
   a cold-bent insulating glazing, and
   a holder,
   wherein the metal framework and the insulating glazing are rendered integral by the holder, which forces the cold-bent insulating glazing to retain a bent shape conferred on it by the framework and prevents the cold-bent insulating glazing from reverting to an original pre-cold-bent shape, and
   wherein the cold-bent insulating glazing comprises glass substrates which are separated by a gas-filled cavity, a water-tight barrier located between the glass substrates and framing the glazing, and a water absorber.

2. The module of claim 1, wherein the insulating glazing comprises a laminated glazing comprising glass substrates separated by an interlayer made of polymer material.

3. The module of claim 1, wherein the insulating glazing comprises two laminated glazings separated by a gas-filled cavity.

4. The module of claim 1, wherein the insulated glazing comprises glass substrates, wherein at least one of the glass substrates comprises a tempered glass sheet.

5. The module of claim 1, wherein the insulating glazing has a main face with an area of greater than 3 m².

6. The module of claim 1, wherein the insulating glazing is bent in order for its surface to exhibit, at at least one point, a radius of curvature of between 5 and 20 m in at least one direction.

7. The module of claim 1, wherein the insulating glazing is composed of glass substrates each comprising a single glass sheet which are separated by a gas-filled cavity and does not comprise a laminated glazing.

8. The module of claim 1, wherein the insulating glazing comprises:
   a laminated glazing comprising glass substrates separated by an interlayer made of polymer material.

9. The module of claim 8, wherein the insulated glazing comprises at least one glass substrate comprising a tempered glass sheet.

10. The module of claim 1, wherein
    the insulating glazing is composed of glass substrates each comprising a single glass sheet which are separated by a gas-filled cavity and does not comprise a laminated glazing.

11. The module of claim 10, wherein the insulated glazing comprises at least one glass substrate comprising a tempered glass sheet.

12. The module of claim 1, wherein the cold-bent insulating glazing comprises at least three of said glass substrates, and wherein at least two of said glass substrates form a laminated glazing in which the at least two glass substrates are separated by an interlayer made of polymer material.

13. The module of claim 1, wherein the cold-bent insulating glazing is comprised of said glass substrates separated by said gas-filled cavity and does not comprise a laminated glazing.

14. The module of claim 1, wherein said water-tight barrier comprises a hollow interlayer adhesively bonded to two glass substrates and an external polymeric seal that goes all around the insulating glazing.

15. The module of claim 1, wherein the original pre-cold-bent shape of the insulating glazing is a flat shape.

16. A glazed module, comprising:
a metal framework;
a cold-bent insulating glazing, and
a holder,
wherein the metal framework and the insulating glazing are rendered integral by the holder, which forces the cold-bent insulating glazing to retain a bent shape conferred on it by the framework and prevents the cold-bent insulating glazing from reverting to an original pre-cold-bent shape, and
wherein the cold-bent insulating glazing comprises cold-bent glass substrates which are separated by a gas-filled cavity and a cold-bent water-tight barrier comprising a water absorber located between the cold-bent glass substrates and framing the glazing.

* * * * *